G. LIDSEEN.
PIN CUT OFF AND POINTING MACHINE.
APPLICATION FILED JAN. 27, 1919.
1,363,797.
Patented Dec. 28, 1920.
2 SHEETS—SHEET 1.
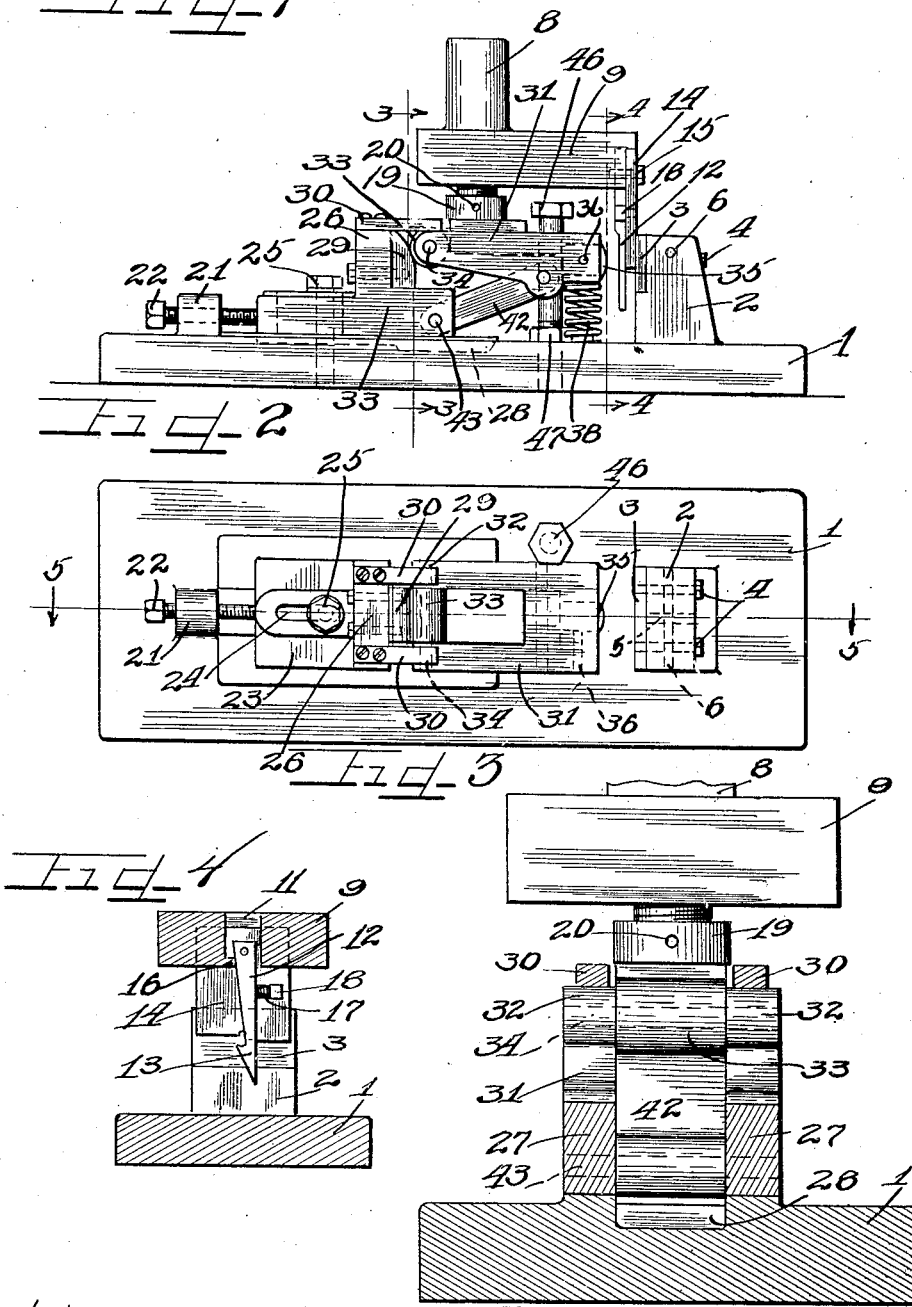

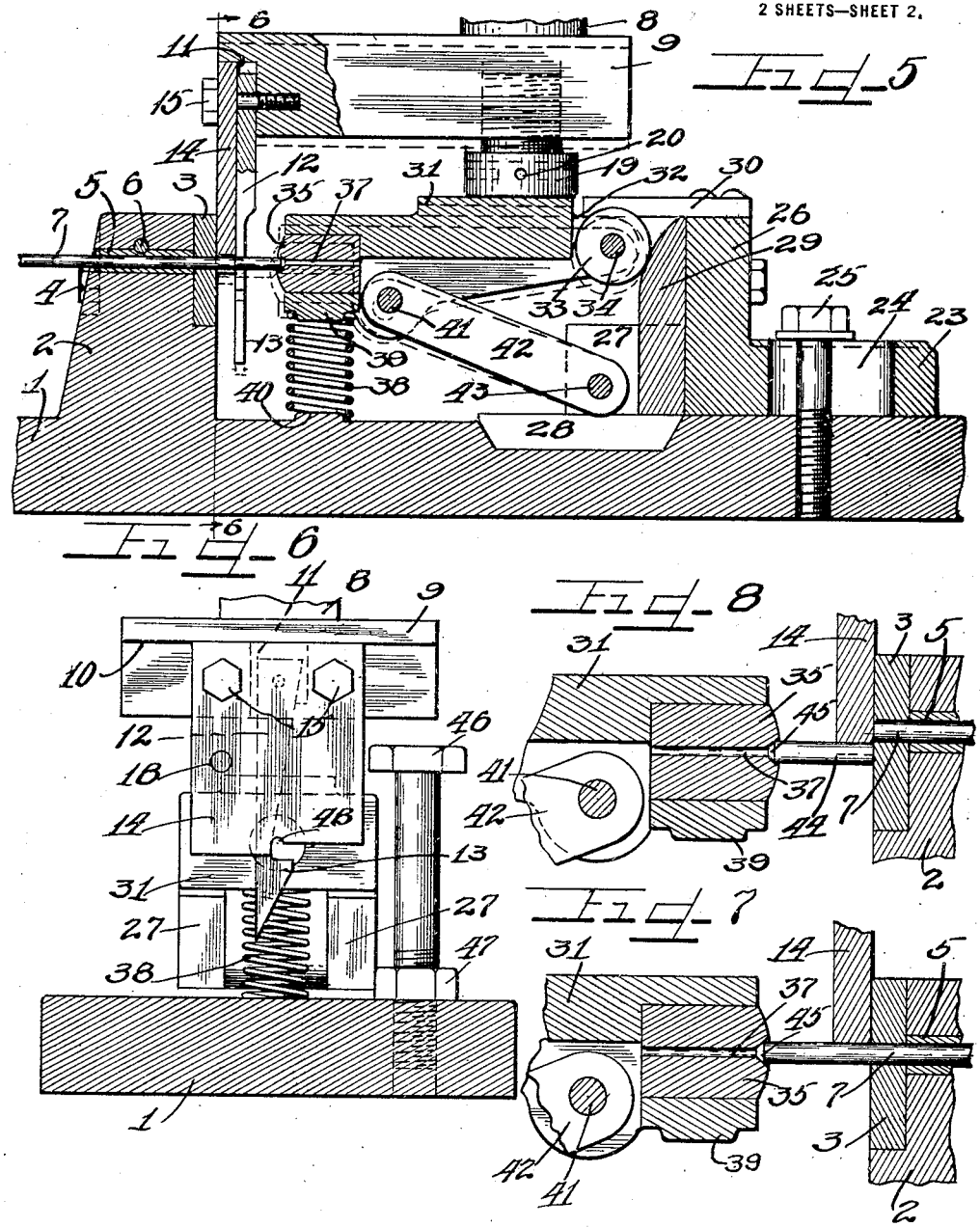

UNITED STATES PATENT OFFICE.

GUSTAVE LIDSEEN, OF CHICAGO, ILLINOIS.

PIN CUT-OFF AND POINTING MACHINE.

1,363,797.  Specification of Letters Patent.  Patented Dec. 28, 1920.

Application filed January 27, 1919. Serial No. 273,311.

*To all whom it may concern:*

Be it known that I, GUSTAVE LIDSEEN, a citizen of the United States, and a resident of the city of Chicago, in the county of Cook and State of Illinois, have invented certain new and useful Improvements in Pin Cut-Off and Pointing Machines; and I do hereby declare that the following is a full, clear, and exact description of the same, reference being had to the accompanying drawings, and to the numerals of reference marked thereon, which form a part of this specification.

Pins used for securing gears, pulleys and other devices on shafts and axles, are usually first cut off by a cutting machine or punch and then pointed or beveled at one end by a different machine or filed manually to permit the pins to be more easily inserted into registering passages in two machine parts which are to be secured together.

This invention relates more particularly to an improved type of machine adapted to simultaneously cut off steel pins from wire stock and bevel or point one end of said pins before ejecting the same from the machine.

It is an object of this invention to provide a pin cutting machine adapted to taper one end of a pin as the other end is being cut off from wire stock.

It is also an object of the invention to construct a machine wherein a pointing die is adapted to bevel or point one end of a pin as the other end is being cut off of a piece of stock steel by a punch cutter mechanism.

Another object of the invention is the construction of a cutoff and pointing die adapted to be adjusted for cutting off and pointing pins of different sizes.

A further object of the invention is the construction of a pin cutting and pointing device wherein a toggle mechanism carrying a pointing die is adapted to be actuated by a punch mechanism carrying a movable cutter which co-acts with a stationary cutter to cut off a length of stock steel to form a pin as the pin is pointed by the die.

It is an important object of this invention to provide a pin cutting and pointing device of simple and effective construction adapted to simultaneously cut and point large quantities of pins.

Other and further important objects of this invention will be apparent from the disclosures in the specification and drawings.

The invention (in a preferred form) is illustrated in the drawings and hereinafter more fully described.

On the drawings:

Figure 1 is a front elevation of a pin cutting and pointing machine embodying the principles of this invention.

Fig. 2 is a top plan view thereof.

Fig. 3 is an enlarged detail section taken on line 3—3, of Fig. 1.

Fig. 4 is a section taken on line 4—4, of Fig. 1.

Fig. 5 is an enlarged longitudinal section taken on line 5—5, of Fig. 2, showing parts in elevation and the operation in dotted lines.

Fig. 6 is a sectional view taken on line 6—6, of Fig. 5.

Fig. 7 is an enlarged fragmentary detail section through the cutters and the pointing die with stock in position to be cut and pointed.

Fig. 8 is a similar section showing a pointed pin cut off of the stock.

As shown on the drawings:

The pin cutting and pointing machine comprises a shoe, foundation or base 1, having integrally formed on the top and near one end thereof a standard, upright or pedestal 2, provided with a recess in the upper portion of the inner face thereof for receiving a lower or stationary cutter 3, seated therein flush with the inner face of said standard. The lower cutter 3, is removably held secured in position by screw bolts 4, and is provided with a cylindrical opening or passage which registers with a passage formed in a guide sleeve or tube 5. The sleeve or tube 5, is removably held secured in position within a passage in the standard 2, by means of a retaining pin 6. The passages in the cutter 3 and in the sleeve 5, are of the same diameter and are axially alined to permit one end of a steel rod or wire 7, from metal stock to be cut, to be projected therethrough into a position for cutting as shown in Fig. 7.

The reference numeral 8, indicates a shank of a power press or punch mechanism not shown. Integrally formed on the lower end of the press shank 8, is a long punch holder or arm 9, disposed longitudinally above the base 1, and having a recess 10, in the lower part of one end thereof. A smaller recess 11, is formed in the press arm 9, to the inside of the middle portion of the recess 10, and pivotally mounted in said recess 11, is the upper end of an ejecting dog 12, the lower end of which is formed to provide an ejecting hook 13. Removably secured in the arm recess 10, to the outside of the ejecting dog 12, is an upper or movable cutter 14, held in place by means of retaining screw bolts 15. The outer surface of the upper cutter 14, is adapted to lie to the inside and adjacent the inner face of the lower cutter 3, so that the cutting edge of said upper cutter may act to cut off the inner end of the metal stock 9, projecting through the opening in said lower cutter. Integrally formed on the press arm 9, within the recess 11, is a lug or stop 16, for limiting the movement of the ejecting dog 12, in one direction. One end of a coiled control spring 17, contacts the edge of the ejecting dog opposite the stop 16, and the other end of said spring 17, is attached to a peg or projection 18, secured at right angles to the inner face of the upper cutter 14. The spring 17, serves to hold the ejecting dog against the stop 16, as clearly shown in Fig. 4. Adjustably threaded into the bottom of the press arm 9, in axial alinement with the press shank 8, is the threaded end of an adjusting screw or punch head 19, for governing the depth of movement of a pointing mechanism hereinafter described. The punch head of the adjusting screw 19, is provided with a plurality of radial recesses 20, for receiving a rod or tool to permit ready turning of said adjusting screw.

Integrally formed centrally on the top and near the other end of the base 1, opposite the standard 2, is a boss or support 21, provided with a longitudinally threaded passage through which is adjustably threaded a stop screw 22, the end of which serves as an abutment for limiting the outward sliding movement of a carriage slidable upon the base 1, to the inside of said boss 21. The slidable carriage embraces a flat horizontal block or body 23, provided with a vertical opening or slot 24, through which an adjustable locking screw bolt 25, projects and threads into the base 1, for holding the carriage locked in an adjusted position. The length of the slot 24, limits the adjustable movement of the carriage with respect to the base 1, on which it is mounted. Formed integrally on the top of the carriage block to the inside of the locking screw 25, is an upright post, pedestal or standard 26, having integrally formed on the lower portion of the inner face thereof a pair of spaced parallel arms or walls 27, the lower surfaces of which rest upon the top of the base 1, on opposite sides of a recess 28, formed in said base 1, as clearly shown in Fig. 5. Rigidly secured to the inner face of the upright post 26, and between the walls 27, is a cam block 29, the cam surface of which curves toward the upper inner edge of said post 26. A pair of stop arms 30, are rigidly secured upon the top of the post 26, one on each side of the cam block 29, and extend inwardly over the carriage walls 27.

The pin tapering or pointing mechanism embraces a striking block 31, bifurcated at the cam end of the device to afford separated bearing arms 32, between which a cam roller 33, is rotatably supported on a cam roller bearing pin 34. The opposite end of the striking block 31, is disposed adjacent the cutters, and is recessed to hold a pin pointing die 35, securely held in place by a set screw 36. The pointing die 35, is provided with a longitudinal passage 37, the outer end of which is reamed out to afford a tapered seat, as shown in Figs. 7 and 8. Adjustably supporting the die end of the striking block 31, is a heavy coiled spring 38, the upper end of which engages around a boss 39, integrally formed on the bottom of the striking block. The lower end of the spring 38, is engaged around a boss 40, integrally formed on the top of the base 1, between the standard 2, and the recess 28. Pivotally attached to the bottom of the striking block 31, by means of a bearing pin 41, is one end of an equalizing link or toggle 42, the other or lower end of which is pivotally connected by means of a bearing pin 43, between the walls 27, of the adjustable carriage mechanism. As shown in Fig. 8, the reference numeral 44, indicates a pin which is cut from the metal stock 7, and has one end thereof beveled, tapered or pointed as denoted by the reference numeral 45. For the purpose of taking up any drop which may occur when the punch head 19, is loose in the punch holder 9, a stop screw bolt 46, is adjustably threaded into the base 1, to one side of the striking block 31, and is held in locked adjusted position by means of a lock nut 47.

The operation is as follows:

A length of wire or metal stock 7, to be cut into pins is first inserted through the guide sleeve 5, and through the opening in the lower stationary cutter 3, with the inner end of the wire 7, disposed adjacent the pointing die 35. When the machine is set in operation the punch press mechanism 8—9, is moved downwardly so that the punch 19, will strike the block 31 of the pointing mechanism, causing the same to move downwardly and forwardly toward the standard 2, against the action of the heavy control spring 38, which is compressed. The downward movement of the block 31, causes the cam roller 33, to roll downwardly on the cam member 29, thereby imparting the forward movement to the block 31, the pointing die 35, of which is consequently forced against the inner end of the wire stock 7, as shown in Fig. 7, to point, taper or bevel the inner end of the wire stock as denoted by the reference numeral 45. The link 42, acts as an equalizing member for the proper operation of the pointing mechanism of which it forms a part.

The downward movement of the press punch mechanism 8—9, also serves to move the upper cutter 14, downwardly therewith, so that the cutting notch 48, shown in Fig. 6, will engage over the wire stock 7, to grip the inner projecting end of the wire stock. The upper cutter 14, in its downward movement co-acts with the lower stationary cutter 3, to cut off the inner end of the wire stock 7, to form the pin 44, as shown in Fig. 8. The pointing of the inner end of the pin is substantially done simultaneously with the cutting off of the pin from the wire stock 7. The spring 17, of the ejecting dog 12, permits the ejecting dog to move away from the stop 16, to permit the tapered lower end of the ejecting dog to pass over the inner projecting end of the wire stock and engage therebeneath.

Release or upward movement of the press punch 8—9, causes retraction of the punch head 19, permitting the spring 38, to force the pointing mechanism upwardly and rearwardly with the roller 33, rolling up on the cam 29, until the striking block 31, contacts the stops 30, which acts to limit the upward movement of said pointing mechanism. The upward and rearward movement of the pointing mechanism thus releases the pin to some degree and permits the hook 13, of the ejecting dog 12, to contact the under side of the pointed pin to pull it out from between the lower cutter and the pointing die 35.

Pins of any desired diameter may be cut by the machine by simply changing the cutters 3 and 14, the wire guide sleeve 5, and the pointing die 35, for other cutters, and a different sleeve and die which will accommodate wire stock of the diameter desired. The slidable carriage mechanism may be adjusted by releasing the locking bolt 25, to permit the carriage to be moved forwardly, or rearwardly from the standard 2, so that different length of pins may be cut by the machine. Pins of any desired length and diameter may be readily cut and pointed by the machine in large or small quantities in a shorter time and much cheaper than by first cutting off the pin lengths in one machine and pointing the pins in another machine or manually.

I am aware that numerous details of construction may be varied through a wide range without departing from the principles of my invention as defined in the appended claims, and I therefore do not purpose limiting the patent granted otherwise than necessitated by the prior art.

I claim as my invention:

1. A pin cutting and pointing machine embracing means for holding wire stock to be cut, an adjustable pin pointing mechanism, a cutter mechanism, a punch mechanism for operating said pointing mechanism and said cutter mechanism for pointing and cutting off a pin from said wire stock, and means carried by said punch mechanism for ejecting the pointed pin.

2. A machine of the class described comprising a guide for holding wire to be cut, cam controlled pin pointing means, cutting means, a press punch for actuating said pointing means and said cutting means to cause a pin to be cut off of said wire and pointed at one end, and a hooked ejector actuated by said press punch for ejecting the pointed pin.

3. A machine of the class described comprising guide means for holding wire to be cut into pins, a pointing mechanism, adjustable cam means for controlling the operation thereof, a cutter mechanism, punch press means for simultaneously actuating said pointing mechanism and said cutter mechanism to cut off a pin from said wire and point one end of said pin, and a spring controlled ejector carried by said punch press for ejecting the pointed pin.

4. A machine of the class described embracing guide cutter means for holding wire in position to be cut into pins, a spring controlled pointing mechanism, adjustable cam means for governing the operation of said pointing mechanism, a punch press mechanism, cutter means mounted thereon and adapted to be moved to co-act with said guide cutter means to cut off a pin when said punch press mechanism is lowered, said punch press mechanism also adapted in its downward movement to operate said pointing mechanism to cause the same to point one end of said pin, and an ejector carried by said punch press mechanism adapted to eject the pointed pin when said punch press mechanism moves upwardly and releases said pointing mechanism.

5. In a pin making machine of the class described, means for holding metal stock, a movable pointing mechanism, a spring supporting one end thereof, a roller on the other end of said pointing mechanism, cam means for governing the movement of said pointing mechanism, an equalizing link pivotally connected to said pointing mechanism and to said cam means, and a punch mechanism adapted to strike said pointing mechanism to cause the same to move downwardly and forwardly to engage the end of said metal stock to point the same.

6. In a machine of the class described, means for holding metal stock, a movable striking block, a roller rotatably mounted in one end thereof, a pointing die removably secured in the other end of said striking block, a spring supporting one end of said striking block, an adjustable cam mechanism, means for holding the same locked in an adjusted position, an equalizing link pivotally connected to said striking block, stops on said cam mechanism for limiting the upward movement of said striking block, and a mechanism adapted to strike said striking block to move the same downwardly and forward with the roller tracking on the cam to force the pointing die against the end of the metal stock to point the same.

7. A pin making machine comprising stationary cutter means for holding a wire to be cut into pins, a movable striking block, a roller mounted in one end thereof, a pointing die removably secured in the opposite end of said block, a spring supporting the die carrying end of said block, an adjustable cam mechanism, means for holding the same locked in an adjusted position, a link pivotally connected to said block and to said cam mechanism, stops on said cam mechanism for limiting the upward movement of said block, punch means adapted to move downwardly and strike said block to move the same downwardly and forwardly with the roller tracking on said cam mechanism to force the pointing die against the inner end of said wire to point the same, and cutter means carried by said punch means adapted to co-act with said stationary cutter means to cut off the pointed end of the wire to provide a pin.

8. A pin pointing and cutoff machine comprising a stationary cutter means for holding a wire, a movable pointing die, means for governing the movement thereof, movable cutter means adapted to move said die against the inner end of the wire to point the same as said movable cutter means co-acts with said stationary cutter means to cut off a length of the pointed end of the wire to provide a pointed pin, and ejecting means carried by said movable cutter means adapted to eject the pointed pin cut from said wire.

9. A pin making machine embracing stationary cutter means for holding a wire, a slidable pointing mechanism, an actuating mechanism, a cutter carried thereby adapted to be moved downwardly to co-act with said stationary cutter means to cut off the inner end of said wire, said actuating means adapted in its downward movement to slide said pointing mechanism downwardly and forwardly against the inner end of said wire to point the same.

10. A pin making machine embracing a stationary cutter for holding a wire, a movable pointing mechanism, adjustable cam means for governing the movement of said pointing mechanism, a power press, a punch adjustably mounted in the bottom thereof, a cutter carried by said power press adapted to be moved downwardly to co-act with said stationary cutter to cut off a pin length of said wire, said punch adapted to be moved downwardly by said power press to strike said pointing mechanism and cause the same to press against the inner end of said wire to point the same, and means on said power press adapted to eject the pointed pin length cut from said wire when said power press moves upwardly and releases the pointing mechanism.

11. A pin making machine comprising a stationary cutter for holding a wire, a movable pointing die mechanism, a power press, a punch adjustably carried thereby adapted to strike said die mechanism when said power press moves downwardly to cause said die mechanism to press against the inner end of said wire to point the same, a cutter carried by said power press adapted to co-act with said stationary cutter to cut off the inner pointed end of he wire to provide a pin, means for ejecting the pointed pin, and an adjustable stop for the power press adapted to take up any drop which may occur when said punch is loose.

In testimony whereof I have hereunto subscribed my name in the presence of two subscribing witnesses.

GUSTAVE LIDSEEN.

Witnesses:
 EARL M. HARDINE,
 CHARLES W. HILLS, Jr.